(12) United States Patent
Agrawal et al.

(10) Patent No.: US 6,320,847 B1
(45) Date of Patent: Nov. 20, 2001

(54) METHOD AND APPARATUS FOR REDUCTION OF CALL SETUP TIME USING ANTICIPATION TECHNIQUE FOR MULTIMEDIA APPLICATIONS IN WIDELY DISTRIBUTED NETWORKS

(75) Inventors: Dharma P. Agrawal, Raleigh, NC (US); Prathima Agrawal, New Providence; Ashok N. Rudrapatna, Basking Ridge, both of NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 08/972,617

(22) Filed: Nov. 18, 1997

(51) Int. Cl.[7] ............................................. G01R 31/08
(52) U.S. Cl. ........................ 370/238; 370/522; 370/410
(58) Field of Search ................................. 379/219, 220, 379/221, 229, 230; 370/410, 522, 238, 252, 264, 351, 360, 389, 398, 422; 455/411, 445

(56) References Cited

U.S. PATENT DOCUMENTS

| | | | |
|---|---|---|---|
| 5,130,982 | * | 7/1992 | Ash et al. ............................. 370/352 |
| 5,802,153 | * | 9/1998 | Sridhar et al. ....................... 375/220 |
| 5,872,523 | * | 2/1999 | Dellaverson et al. ............ 340/825.52 |
| 5,963,625 | * | 10/1999 | Kawecki et al. ..................... 379/114 |

FOREIGN PATENT DOCUMENTS

| | | |
|---|---|---|
| 0708571A2 | 4/1996 | (EP) . |
| 2307618A | 5/1997 | (GB) . |
| WO9631043A | 10/1996 | (WO) . |

* cited by examiner

Primary Examiner—Ahmad Matar

(57) ABSTRACT

In a widely distributed digital communication network call delays and eventual outcome are anticipated (i.e., expected call outcome) at the initiation of a call at an originating terminal and the call is completed by signal switching to its destination terminal and by decreasing the number of related message transfers between network controllers and hubs required to complete the balance of administrative refinements of the call connection. The routing steps for setting up the call trajectory to the destination hub are completed immediately before the administrative steps, such as authentication, access control, bandwidth availability etc., are performed. Administrative refinements subsequent to the preliminary call set up are performed in a distributive manner. Administrative and capacity items are determined and completed post route determination and computed or accessed in parallel making this information available for a final call set up. If this information is adverse the call is immediately terminated. In one aspect the processors for administrative and capacity determination are connected in a parallel manner and work concurrently.

12 Claims, 3 Drawing Sheets

METHOD AND APPARATUS FOR REDUCTION OF CALL SETUP TIME USING ANTICIPATION TECHNIQUE FOR MULTIMEDIA APPLICATIONS IN WIDELY DISTRIBUTED NETWORKS

FIELD OF THE INVENTION

This invention relates to digital communication networks with measurable latency (i.e., call set up delay) in the network and in particular with reducing or minimizing such latency.

BACKGROUND OF THE INVENTION

Call set up in a modern digital telecommunication network involves numerous delays. Many expected delays are due to propagation delay between originating signal entry point and a signal termination point at its destination. Added delays causing significant call set-up latency involve such activities as evaluating control data such as subscriber authentication, call routing determination, access control, bandwidth availability, credit standing of originator, and desired signal encryption. These latency delays are for the most part due to the increasing number of message transfers between processors and controllers required in the system to accommodate these new services and authentication checks. In digital networks these delays further include digital signal processing for features such as error control and speech processing. If these delays are reduced or otherwise off-set call set up could proceed much more rapidly thus improving the overall quality of service.

SUMMARY OF THE INVENTION

Functions processed in arranging call set ups are operated concurrently with an actual call set-up to reduce overall call set up time. In a widely distributed communication network embodying the principles of the invention, call delays and eventual call set-up outcome are initially anticipated (i.e., an expected call outcome) at the initiation of a call from an originating terminal. The call routing connection, from origination hub to termination hub, in one embodiment, is initially completed, by a switched signal connection (including any intermediate hubs in the connection path) to a receiving hub and station/subscriber. In another embodiment the call routing connection is immediately connected to the receiving hub and a final complete connection to the receiving station/subscriber is delayed pending full call approval processing. In both embodiments administrative functions and call processing are performed in parallel with completion or near completion of a call connection.

If administrative and call processing determinations are unfavorable to completion or continuance of the completed call connection, the call connection is immediately disconnected. With parallel operation of these administrative functions both prior to and during call connection delay impact of administrative processing is significantly reduced.

By decreasing the number of related message transfers between network controllers and hubs required to complete the balance of administrative refinements of the call connection, the call is more rapidly and efficiently completed. The routing steps for setting up the call trajectory to the destination hub are nearly or totally completed immediately before the performance of call acceptance administrative steps, such as authentication, access control, bandwidth availability etc.

Administrative refinements during and subsequent to the preliminary call connection can be performed in a distributive manner. Administrative and capacity items are determined and completed during post route connection and connection/determination and computed or accessed in parallel making this information available for a final completion or near completion of the call connection. If this information is subsequently found to be adverse the connection of the call is immediately terminated.

In one aspect the processors for administrative and capacity determination are connected in a parallel manner and work concurrently, through initial probationary call connection or near a complete call connection.

DETAILED DESCRIPTION

Digital communication networks provide many new features not practical in previous network technology such as speech coding, channel coding and various feature and authentication processes. All of these to some degree introduce latency or delays into call set-up in the network, including transmission and processing delays. In addition transmission and signaling links add propagation delay to the overall delay. All of these delays add to the overall degradation of the quality of service to end users.

Upon a request for service by a subscriber to an originating hub, this originating hub sends all relevant data of the call to a central controller of the network for securing all necessary control information. This control information includes authentication of the subscriber call, call routing, access control, availability of bandwidth for the call, credit standing of the subscriber, and encryption information. In a normal prior art telephone digital network call set up for a connection does not start until all this information is returned to the originating hub. Similar processing occurs at the terminating hub, with signals passing from the terminating hub to the controller before the call is connected.

In accord with the invention these message and data transfers are for the most part minimized by reducing the number of transfers required between the controller and the hubs. The call is initially connected or almost connected in anticipation of approval of the call as a result of the information processes. The call is connected between the originating and the terminating hub, including any intermediate hubs in the network. Anticipatory connections, from originating hub to receiving hub, are made while information processing is performed in a distributed manner throughout the network.

Figure 1:
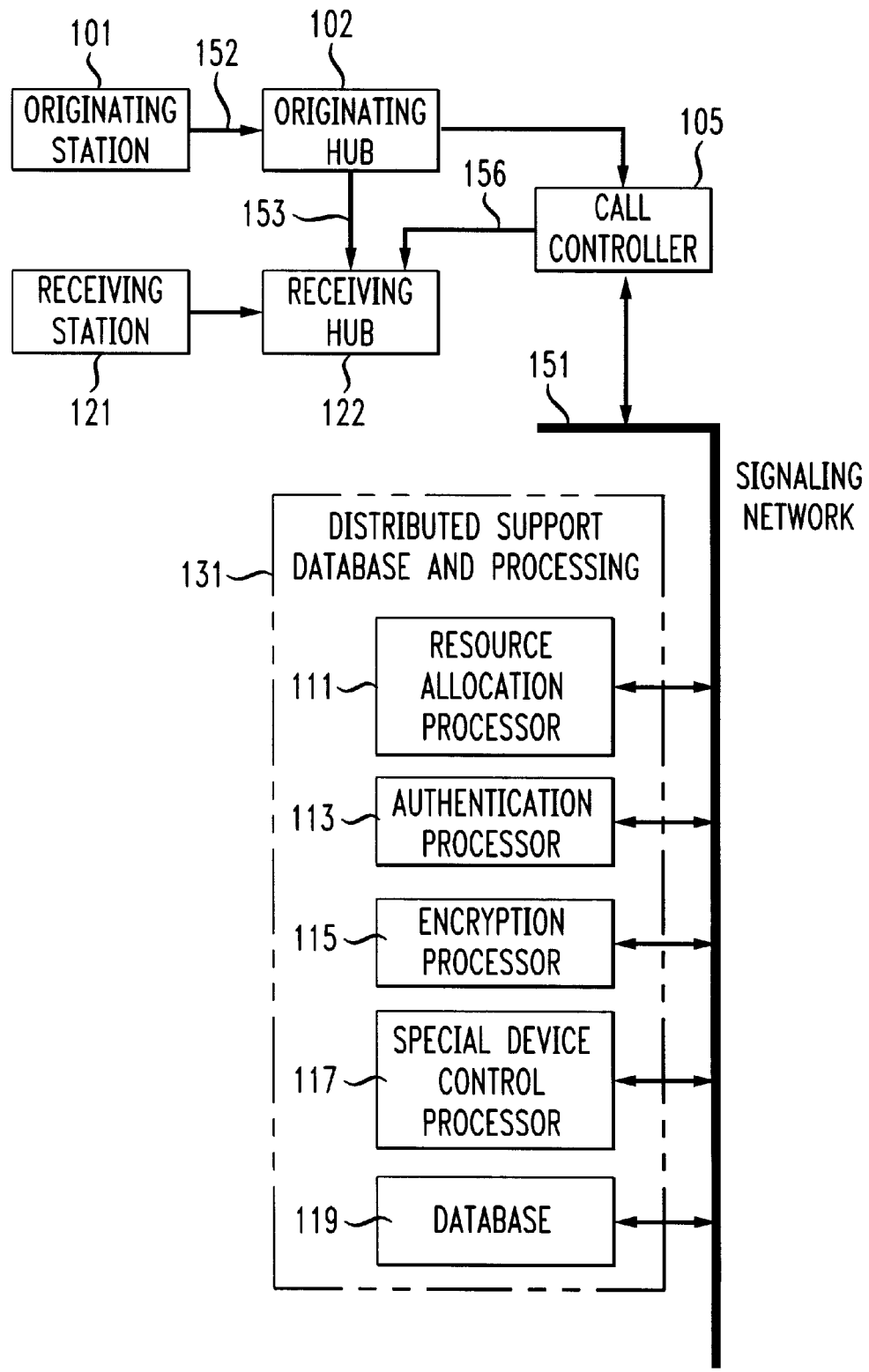
FIG. 1 is a block schematic of a communication network configured for operation of the principles of the invention.

The digital telephone network shown in FIG. 1, is receiving an originating call, at a hub 102, from an originating subscriber/station 101. The originating subscriber/station 101 may be connected to hub 102 either by wired or wireless connections 152. The subscriber/station 101, if mobile, may be in motion and may be quickly serviced by another hub. The hubs 102, (in a system there is typically more than one hub), each may be a wireless base station, a land line switch, a remote switching module, or a satellite or similar station. The hub 102 controls the initial preliminary switched call connection to the receiving hub.

The hub 102 takes the received originating dialed signal and forwards it to a call network controller 105 which takes the received signal, identifies the calling station and determines authentication and features to be accorded the caller seeking connection to a receiving hub 122. Support database/processor stations 131 receive information for processing call characteristics, via several included parallel processing elements connected to signaling network 151. Priority is granted by the originating hub 102 to the dialed number for strict connect processing, via path 153, to the receiving hub 122 prior to administrative process completion, of a call transmission path coupling the originating subscriber/station 101 to a receiving subscriber/station 121, via a receiving hub 122. After administrative processing, final acceptance is forwarded from call controller 105 to the receiving hub 122 via link 156. The call, in one particular arrangement is initially transmitted to the receiving hub 122 where it is transmitted to the receiving subscriber/station 121 or held just short of connection while characteristic and authentication determination is performed by the network.

During the transmission of the call the call network controller 105 interacts with various processors to determine the allowability and characteristics of the call process. These processors include, as illustrative examples, a resource allocation processor 111, an authentication processor 113, an encryption processor 115, a special device control processor 117 and a station/subscriber data base 119 of station features, authentications and characteristics. Resource allocation by processor 111 determines the availability and sufficiency of network switching and transmission capabilities. Authentication by processor 113 determines the subscriber rights to admittance such as up to dated subscriber payments. Encryption by processor 115 is an optional service which may be subscriber requested. Special devices engaged by processor 117 may be auxiliary devices to provide forms of assistance. Subscriber assistance provides special help such as hearing enhancement or special billing arrangements. Information for determining these operations are supplied by the data base 119. These determinations are returned to the network controller 105 and used to determine the ultimate fate of the call initiated from hub 102 and transmitted to receiving hub 122. If the determination is negative the call is terminated even if the initiated call has been temporarily connected.

Figure 2:
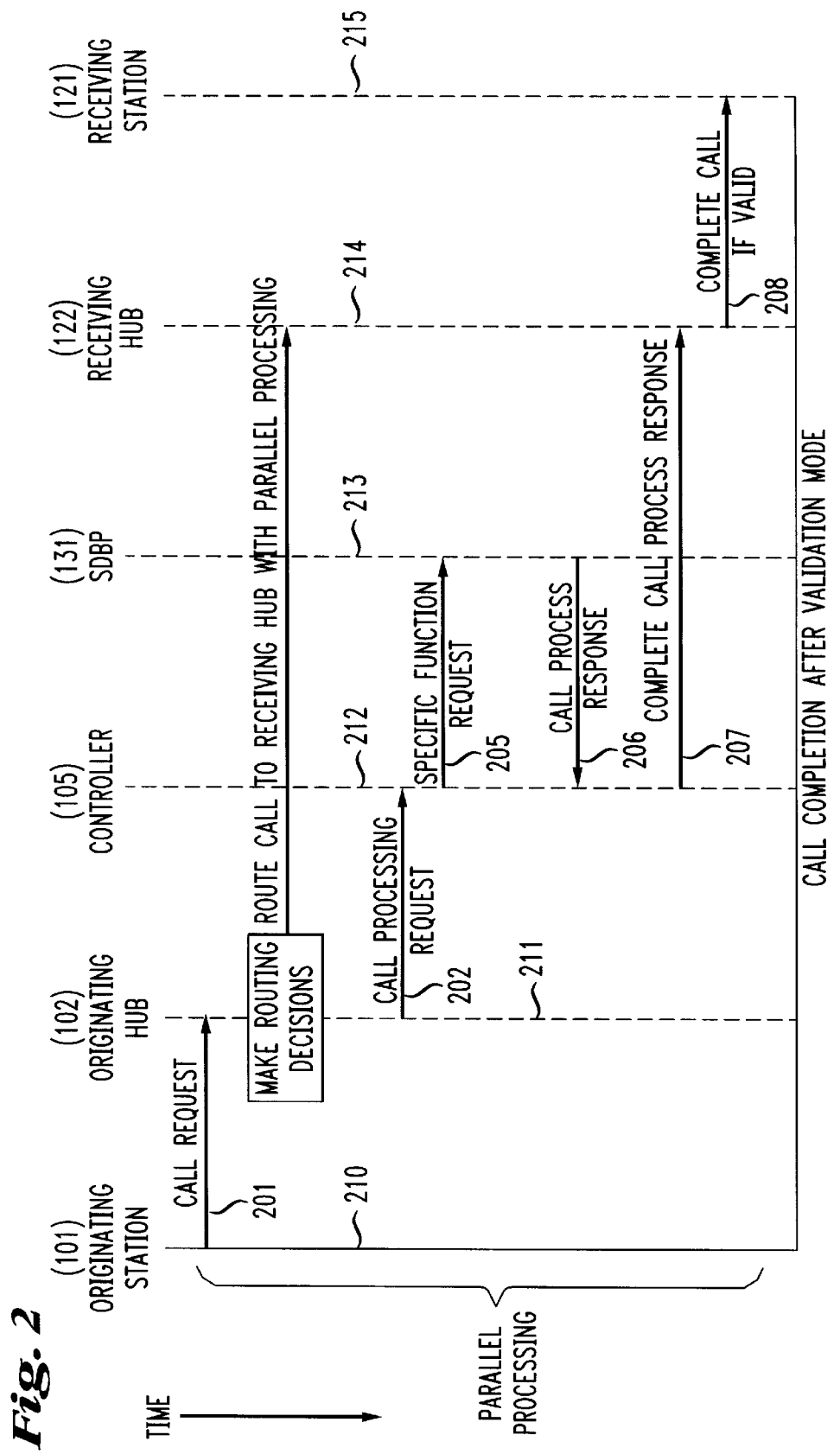
FIG. 2 is a flow process charts showing the operation of of the network of FIG. 1 in achieving a near complete call connection.

A call set-up process chart shown in FIG. 2 shows the process in which a call initiated at an originating station 101 and transmitted to originating hub 102 is substantially but not fully completed until full authorization and characterization is determined. Receipt of these parameters allows completion of the last step of the call connection. The first temporal occurrence is a request for origination of a call, transmitted (arrow 201) from an origination station at location 210 to an originating hub 102 at location 211. Originating hub 102 at location 211 makes the routing decision to route and connect the call to a receiving hub 122, at location 214, which services the receiving station 121 at location 215, but withholding final connection to the receiving hub 122 until call authentication and feature processing (arrows 205,206 and 207) is determined by system databases and processors.

The hub 102 at location 211 sends a request, via arrow 202, to the controller 105 at location 212. The controller sends specific requests (arrows 205,206) to system databases and processors, at location 213, to determine what special features and authentications are assigned the calling subscriber. These processors with the database determine these functions and return this information to the controller at location 213 as a call process response. The controller with this information sends a signal (arrow 207) to the receiving hub at location 214 to the complete the call to the receiving station. This call is completed after call validation as indicated by arrow 208. Due to the simultaneous connection to the receiving hub while validating the call the call is completed more rapidly then with standard call processing.

Figure 3:
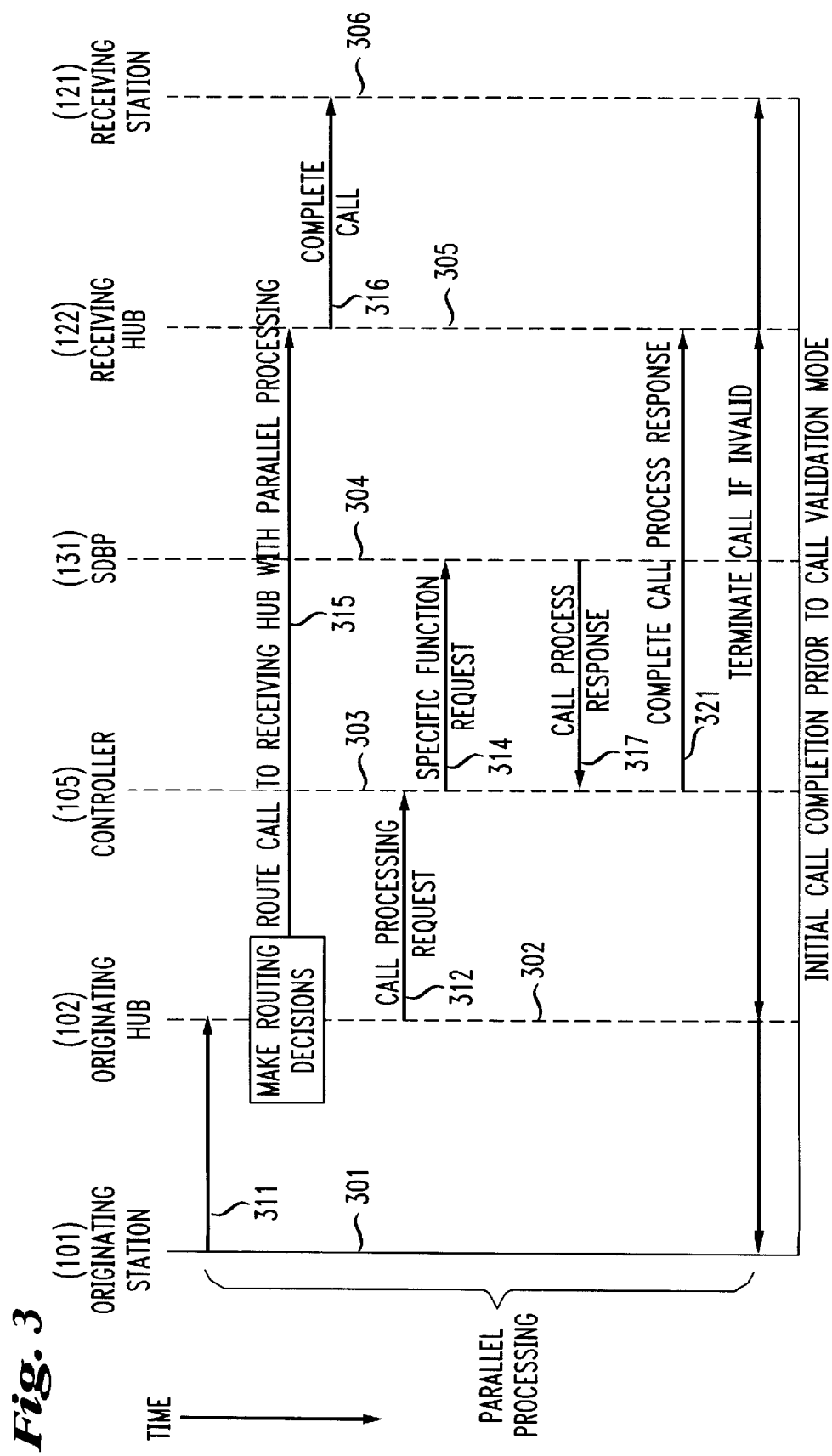
FIG. 3 is a flow process charts showing the operation of of the network of FIG. 1 in achieving a complete call connection.

In another version, as shown in FIG. 3, call completion is achieved before call validation is finished. Initially the originating request from the originating station 101 at location 301 is directed (via arrow 311) to the originating hub at location 302. The originating hub routes the call connection request (arrow 315) to the receiving hub 122 at location 305 with instructions to immediately connect to the receiving station 121 at location 306. The originating hub also makes a call processing request (arrow 312) to the controller 105 at location 303, which in turn makes a call process request to the call processor and data bases at location 304. This processes the call request for subscriber features and authentication and sends a response (arrow 317) to the controller. The controller responds with a complete call response (arrow 321) to the location 305 of the receiving hub. If validity is proper the call is permitted to continue in response and if not the call is terminated even though it is in progress.

The invention claimed is:

1. A method of reducing call set up delay in a digital communication network, comprising the steps of:

establishing at call initiation a preliminary telecommunications path connection between an originating hub and a destination hub by making initial partial routing decisions within an originating hub;

supplementing the initial routing decisions by simultaneously determining needed subscriber and network information in parallel with processes establishing the preliminary telecommunications path;

providing the information to call controllers to achieve a complete call set up if the information is favorable; and refining the preliminary path connection in accord with the provided information.

2. The method of claim 1, comprising:

the preliminary path connection being made from the originating hub to the destination hub and waiting for the favorable information before connecting to a destination station.

3. The method of claim 1, comprising:

the preliminary path connection being made from the originating hub to the destination hub and to the destination station while awaiting for the favorable information and disconnecting if the information is unfavorable.

4. The method of claim 1, comprising:

adjusting a call connection to accommodate path requirements determined by the supplementing by determining needed subscriber and network information.

5. A digital communication network configured for reducing call set up time, comprising:

an originating hub for reception of incoming subscriber originated calls;

a network controller and an interface coupling the originating hub to the network controller;

the originating hub structured operative for routing of the initial call enabling immediate connection of a path to a terminating hub at call initiation;

the network controller further coupling the originating hub to ancillary call processors simultaneously with initial call routing for determining resource and authentication information during call path set up;

the network controller additionally connected for responding to the ancillary call processors to determine acceptance of the call; and the network controller being further connected for communicating this information to the originating and terminating hubs.

6. The digital communication network of claim 5, comprising:

the ancillary call processors including a subscriber authentication processor.

7. The digital communication network of claim 5, comprising:

the ancillary call processors including a call routing processor.

8. The digital communication network of claim 5, comprising:

the ancillary call processors including a bandwidth availability processor.

9. The digital communication network of claim 5, comprising:

the ancillary call processors including a signal encryption processor.

10. The digital communication network of claim 5, comprising:

the ancillary call processors including an access control processor.

11. The digital communication network of claim 5, comprising:

the ancillary call processors including a subscriber credit standing processor.

12. The digital communication network of claim 5, comprising:

the ancillary call processors including error correction and speech processing.

* * * * *